US011996626B2

(12) United States Patent
Turpin et al.

(10) Patent No.: US 11,996,626 B2
(45) Date of Patent: *May 28, 2024

(54) FIELD-ASSEMBLED MODULAR PHASED ARRAY SATCOM TERMINAL

(71) Applicant: All.Space Networks Limited, Reading (GB)

(72) Inventors: Jeremiah P. Turpin, Linthicum, MD (US); Brian Murphy Billman, Baltimore, MD (US); John Finney, London (GB)

(73) Assignee: All.Space Networks Limited, Reading (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/089,779

(22) Filed: Dec. 28, 2022

(65) Prior Publication Data

US 2023/0223684 A1 Jul. 13, 2023

Related U.S. Application Data

(63) Continuation of application No. 17/221,143, filed on Apr. 2, 2021, now Pat. No. 11,581,639.
(Continued)

(51) Int. Cl.
*H01Q 3/26* (2006.01)
*H01Q 3/38* (2006.01)
(Continued)

(52) U.S. Cl.
CPC ........... *H01Q 3/267* (2013.01); *H01Q 3/2676* (2013.01); *H01Q 3/38* (2013.01); *H04B 10/118* (2013.01);
(Continued)

(58) Field of Classification Search
CPC ........ H01Q 3/267; H01Q 3/2676; H01Q 3/38; H01Q 1/273; H01Q 19/06; H01Q 21/0025;
(Continued)

(56) References Cited

U.S. PATENT DOCUMENTS 7,392,011 B1  6/2008 Jacomb-Hood
7,474,249 B1  1/2009 Williams et al.
(Continued)

FOREIGN PATENT DOCUMENTS

EP       3561951 A1   10/2019
GB       2404287 A    1/2005
WO   WO 2009/039998 A2  4/2009

OTHER PUBLICATIONS

International Search Report and Written Opinion dated Jun. 17, 2021 in connection with International Application No. PCT/IB2021/052759.
(Continued)

*Primary Examiner* — Don N Vo
(74) *Attorney, Agent, or Firm* — Wolf, Greenfield & Sacks, P.C.

(57) ABSTRACT

A field-assembled satellite communications terminal has a plurality of discrete, modular aperture blocks. Each aperture block contains an electrically steered antenna aperture, and a plurality of interconnection ports for power and data communications between the plurality of aperture blocks. The plurality of interconnection ports are removably connectable by the end user in the field. The terminal further has a signal processing system for receiving, processing, and generating signals to and from the apertures. The aperture blocks are connected to each other in the field and self-configure to form an electrically-steered antenna.

30 Claims, 12 Drawing Sheets

Related U.S. Application Data

(60) Provisional application No. 63/004,929, filed on Apr. 3, 2020.

(51) Int. Cl.
   *H04B 10/118* (2013.01)
   *H04B 17/12* (2015.01)
   *H04B 17/21* (2015.01)
   *H04B 17/27* (2015.01)

(52) U.S. Cl.
   CPC ............. *H04B 17/12* (2015.01); *H04B 17/21* (2015.01); *H04B 17/27* (2015.01)

(58) Field of Classification Search
   CPC ...... H01Q 21/20; H04B 10/118; H04B 17/12; H04B 17/21; H04B 17/27; H04B 1/3827
   USPC ............................................................ 398/25
   See application file for complete search history.

(56) References Cited

U.S. PATENT DOCUMENTS

| | | | |
|---|---|---|---|
| 11,170,151 B2 * | 11/2021 | Hook | G06F 30/398 |
| 11,581,639 B2 | 2/2023 | Turpin et al. | |
| 2011/0109507 A1 | 5/2011 | Warnick | |
| 2011/0248796 A1 | 10/2011 | Pozgay | |
| 2012/0268344 A1 | 10/2012 | McCarthy | |
| 2017/0104268 A1 * | 4/2017 | Ford | H01Q 3/36 |
| 2018/0166781 A1 | 6/2018 | Snyder et al. | |
| 2018/0248598 A1 | 8/2018 | Gambahaya | |
| 2021/0249767 A1 | 8/2021 | Greenwood et al. | |
| 2021/0313680 A1 | 10/2021 | Turpin et al. | |

OTHER PUBLICATIONS

International Preliminary Report on Patentability dated Oct. 13, 2022 in connection with International Application No. PCT/IB2021/052759.

\* cited by examiner

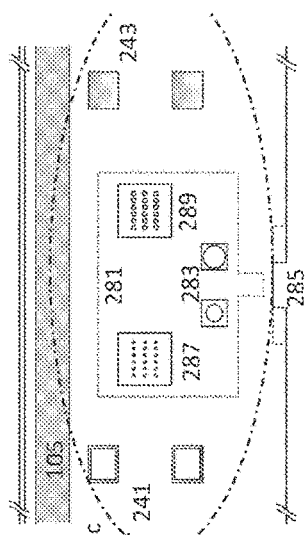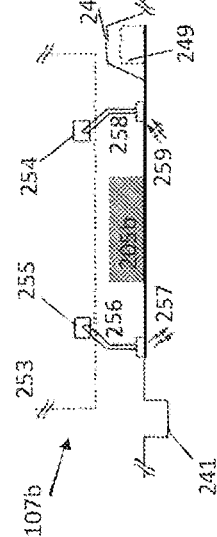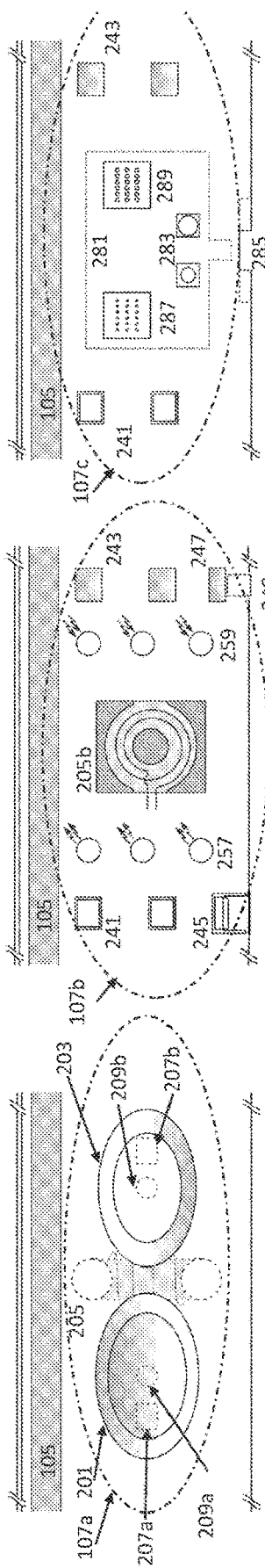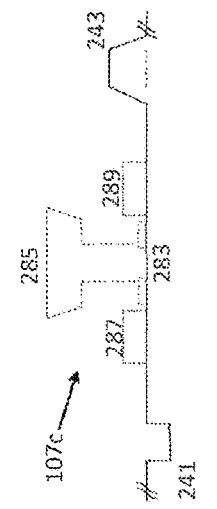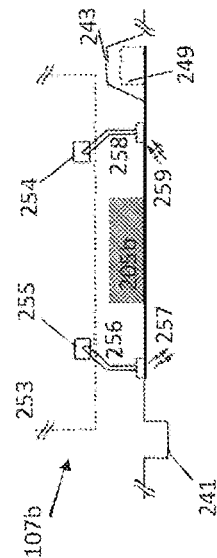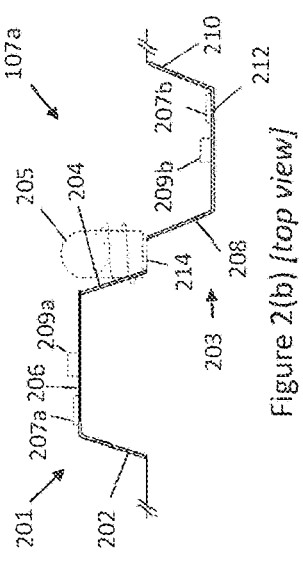

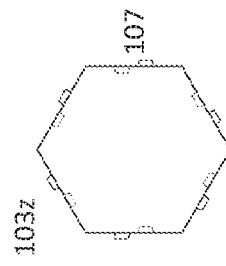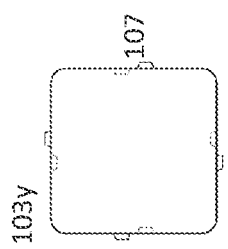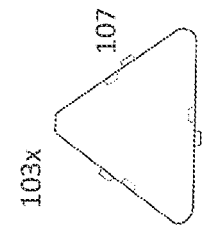
Figure 5

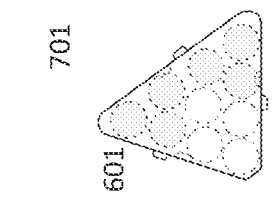
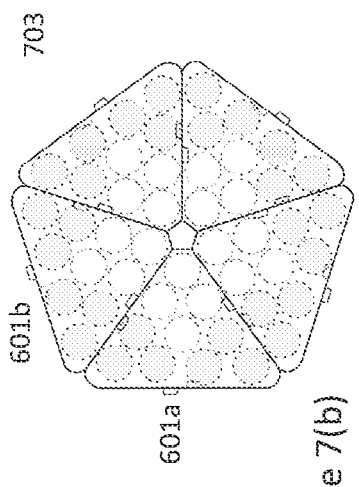
Figure 7(a)
Figure 7(b)
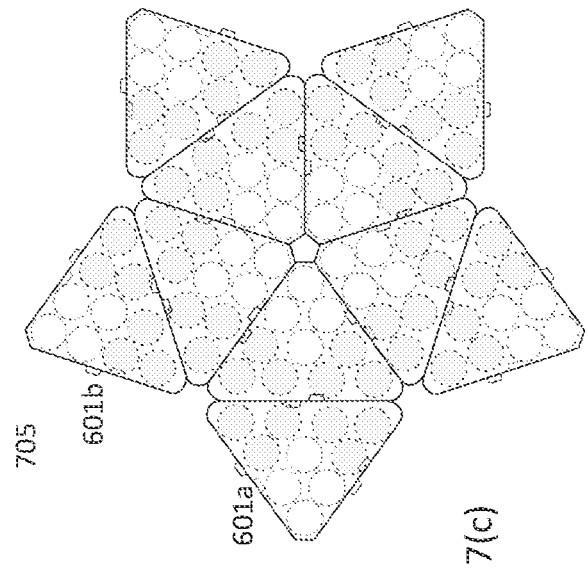
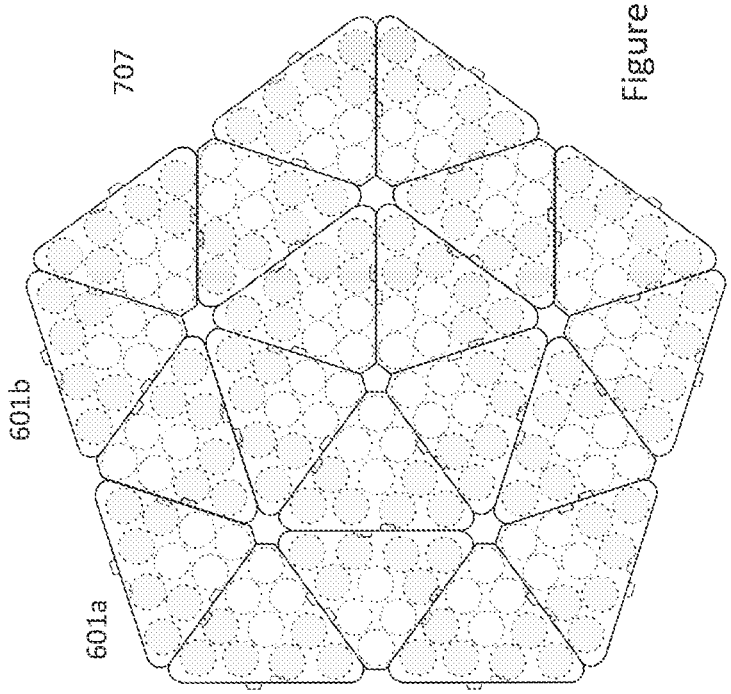
Figure 7(c)
Figure 7(d)

FIELD-ASSEMBLED MODULAR PHASED ARRAY SATCOM TERMINAL

RELATED APPLICATIONS

This application claims the benefit as a continuation under 35 U.S.C. § 120 of U.S. patent application Ser. No. 17/221,143, filed Apr. 2, 2021 and entitled "FIELD-ASSEMBLED MODULAR PHASED ARRAY SATCOM TERMINAL," which is hereby incorporated by reference herein in its entirety.

U.S. patent application Ser. No. 17/221,143 claims the benefit of priority of U.S. Provisional Application No. 63/004,929 filed on Apr. 3, 2020, the content of which is relied upon and incorporated herein by reference in its entirety.

FIELD OF THE DISCLOSURE

The present disclosure relates to a manpack or portable VSAT satellite communications terminal, including antenna, modem, and supporting equipment.

BACKGROUND

Communications satellites provide connectivity around the globe across a number of frequency bands and services to fixed, mobile, permanent, and temporary sites. The VSAT (Very Small Aperture Terminal) class of service that is provided in the X, Ku, and Ka frequency bands is used in civil, commercial, and defense applications that require global connectivity and high bandwidths from moderate aperture sizes. Alternate, lower frequency bands (UHF, L-, S-, C-) services apply to uses requiring much lower bandwidth, unless extremely large antennas can be used.

Communicating with a satellite requires a terminal, which includes an antenna, modem, and associated amplifiers, mixers, and other RF or microwave components. Terminals are differentiated primarily by the antenna, and whether the antenna is fixed or steerable, mechanical or electronic.

For defense and civil applications where intermittent and on-the-fly communications are required in remote locations, a particular class of terminals known as "manpack" are designed to be easily transported, assembled, operated, and disassembled by a very small group of individuals. Manpack terminals can be regarded as a subset of the class of Comms-on-the-Halt antennas, but specifically those that can be transported by one or two individuals on foot. Weight, power consumption, volume, and ease of use are key differentiators for this market segment. In particular, the ability to travel with an antenna on an aircraft in hand or checked luggage is highly regarded.

For VSAT frequencies, parabolic reflector antennas are almost universal among manpack solutions. The most common approach is a parabolic dish that is broken down into pieces that dip together to form the right shape, with a central collapsible frame holding the feed antenna, subreflector, amplifiers, modem, batteries, and other equipment. See e.g., Hawkeye III Lite, 1.2M Tri-band VSAT, www.L3Harris.com. The size and the weight determine whether the terminal is regarded as a manpack or a larger flyaway terminal that is intended for truck or plane transport rather than for individuals. There are varieties that are an inflatable sphere that contains the reflector and the feed. See e.g., Expeditionary SATCOM, Cubic, www.cubic.com. Some models have automatic motor-driven pointing, others require a skilled or semi-skilled user to align the reflector with the desired satellite. Fully integrated pre-staged and pre-configured modems are very common, since the end-users are interested in rapid setup and breakdown of communications without the need for configuration and complex wiring or setup.

Flat panel antennas (see e.g., Paradigm Communications Swarm 45 (45 cm) Flat Panel Ka-Band Satellite Terminal, Digisat International, Inc.) are an alternative to parabolic reflectors as a fundamental antenna for SATCOM terminals. These terminals can be smaller and, in some cases, lighter than parabolic antennas, but typically are not used for very large aperture sizes and performance applications.

Typical phased array or electronically-steered antennas are rarely used in manpack configurations primarily due to the high power consumption relative to the performance, as well as the limitation on aperture size imposed on a single-piece antenna designed to be man-portable. In other applications, phased arrays have many benefits, including the capability of near-instant steering and tracking with higher reliability, due to a lack of moving parts. Getting high performance requires large aperture sizes, which also scales the power requirements.

SUMMARY OF THE DISCLOSURE

A field-assembled electronically-steered phased array for VSAT satellite communications that includes a set of independent, identical, self-contained aperture blocks. The aperture blocks snap together mechanically or magnetically in the field with limited or no exposed contacts, and self-configure and calibrate to form a single phased array or otherwise electrically-steered antenna aperture. Each block includes control, power supply, antenna segment, signal processing, and interfaces so that any combination of blocks, from a single block up to a large, unspecified number, can be tiled together to form a functioning satcom terminal. Different implementations may include integrated modem and batteries, or have a single externally-connected block that provides those and other capabilities for the assembled terminal as a whole.

The overall antenna aperture having the combination of the antenna apertures from each of the assembled aperture blocks has gain and performance corresponding to its size—the more blocks, the more antenna gain, and the higher the achievable performance. In the field, as many blocks as are available are combined on-the-fly to form a functioning communications terminal with automatic configuration, satellite tracking, and connection initialization, which can then be instantly disassembled and distributed for transport, decentralizing the communications capability within a group of individuals compared to the conventional case of a single individual carrying the communications equipment. Each individual block is lightweight and easily transported. This system can be used as a manpack or flyaway terminal, with the number of modules allocated determining the overall performance.

The following references noted herein are incorporated by reference in their entirety.

BRIEF DESCRIPTION OF THE DRAWINGS

FIG. 2(a) shows the side and FIG. 2(b) shows the top view of the interconnection structure and interfaces between two aperture blocks involving magnets for physical alignment and wireless data and power transfer methods.

FIG. 2(c) shows the side and FIG. 2(d) shows the top view of an alternate interconnection structure and interfaces between two aperture blocks involving transformers for power transfer and optical interfaces for data transfer.

FIG. 2(e) shows the side and FIG. 2(f) shows the top view of a second alternate interconnection structure and interfaces between two aperture blocks involving conductive contacts for power and data signals.

FIG. 5 shows representative options for the block shapes and interconnection geometry.

FIGS. 7(a)-(d) show different size arrays constructed using the same aperture block.

DETAILED DESCRIPTION OF THE DISCLOSURE

Figure 1:
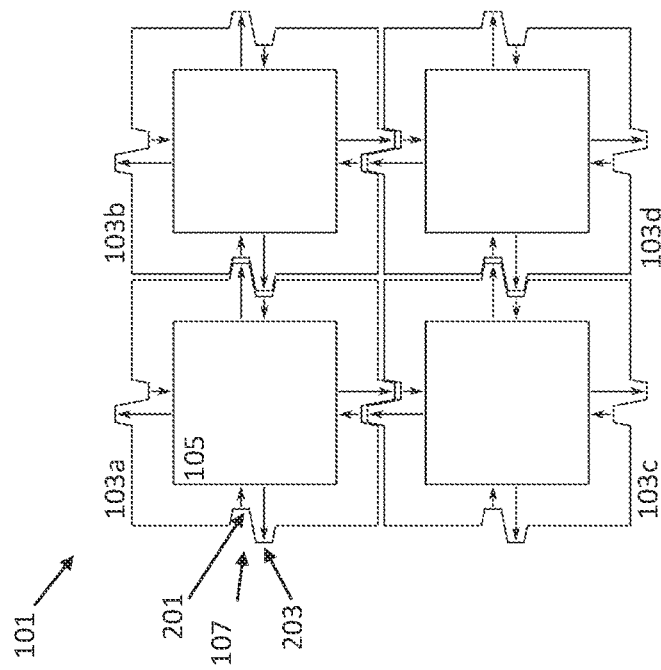
FIG. 1 shows the disclosure having a collection of self-contained electronically-steered modular antenna aperture blocks that interconnect in the field to form a terminal.

The accompanying drawings are incorporated in and constitute a part of this specification. It is to be understood that the drawings illustrate only some examples of the disclosure and other examples or combinations of various examples that are not specifically illustrated in the figures may still fall within the scope of this disclosure. Examples will now be described with additional detail through the use of the drawings, in which:

This disclosure comprises a field-assembled satellite communications terminal intended for manpack or flyaway applications where portability, ease of use, and robustness are critically important, though other applications can also be provided. As shown in FIG. 1, the satellite communications terminal 101 includes a plurality of interconnected discrete aperture blocks 103, including a first block 103a, second block 103b, third block 103c, and fourth block 103d, though any suitable number of blocks 103 can be utilized. Generally, each discrete block 103 in an array 101 is identical, interconnected with its neighbors in a modular fashion with potential rotations between adjacent blocks to form a larger, interconnected array of blocks of an arbitrary size to form a satellite communications terminal, from a single block to a large number of blocks. Each modular block can operate independently if appropriately connected to power and local data communications channel (i.e., ethernet, modem) with the end user, but the more modular blocks are interconnected, the greater the capability of the combined terminal. In this illustration, each block 103 is substantially square or rectangular, with four sides having edges, and an aperture 105 arranged at the center of the block 103; different block shapes are also possible.

One key feature of the disclosure is that the discrete, modular blocks 103 are assembled into a terminal 101 on-demand by the end user in the field (e.g., at the point of use, without a requirement for specialty tools or training), that the combined blocks then self-calibrate and initialize themselves to communicate with a satellite no matter how many blocks are in use. The signals received from the satellite and transmitted to the satellite from each aperture block are transferred between blocks as digitized waveforms having digital samples of the waveform either at the RF frequency or at an Intermediate Frequency (IF) or at baseband, to reduce the DSP requirements. This is different from other phased arrays described as composed of modular subarrays that are assembled into an array, but are assembled and calibrated in the factory or during installation on a mobile platform, and are not repeatedly disassembled and reassembled into a functional terminal in varying numbers and configurations by the end user. Self-calibration to correct for time-dependent changes to thermal or frequency response is common in existing phased arrays, but this standard capability (also called Built-In Test [BIT]) does not support the terminal's continued operation after being disassembled into component modules, transported, and reassembled in potentially different shapes and configurations when next required. The exchange of digitally sampled waveform data simplifies the calibration process, since the digital communications removes the sensitivity to phase and magnitude variations in each block connection that would differ with each assembly. Once digitized, the waveforms can be transferred between the modular, field-assembled blocks without distortion or signal loss.

A key feature of each block 103 is the phased array or other electrically-steered antenna aperture 105, which is recessed inside of but at the top of the block 103 such that it can radiate freely into the upper hemisphere. When the blocks are interconnected for operation in the field, the antenna aperture 105 of each block 103 are enabled and operate together to form a larger, combined or aggregate antenna aperture, with gain and overall antenna performance commensurate with the size of the combined or aggregate antenna aperture. A variable number of blocks 103 can be assembled into an array. The blocks are interconnected through communications and power transfer ports 107, which also provide for mechanical alignment & orientation between the blocks 103. The ports constrain adjacent blocks to be coplanar (to within mechanical tolerances) and oriented with their normal axes in the same direction, such that all antenna apertures 105 are coplanar to within mechanical tolerances and facing in the same direction, so that they may all communicate with the same targets. In this way, a single aperture block 103 may connect to additional blocks 103a and 103b via the ports 107. In the embodiment shown, the port 107 is located at the center of each side edge of the block 103. The housing or outer case of each block 103 should be sealed and proofed against environmental conditions experienced outdoors (moisture, dust, sand, mud, etc.). The housing includes the RF-transparent radome above the antenna aperture 105 The ports 107 are formed in the block housing in a manner to prevent moisture or contaminant ingress.

The terminal 101 can be designed to operate at any frequency band, but the preferred implementation is for one of the common VSAT frequency bands of X-band, Ku-band, and the military and commercial Ka-band. To increase operational flexibility, operation across multiple bands in the same aperture is highly desirable for example, a single terminal that would operate across the X and Ku, or Ku and Ka bands.

Each block should be capable of both transmitting and receiving satellite signals through the antenna aperture 105, either in switched half-duplex mode, or simultaneous full-duplex through separate subsets of the antenna for transmit and receive, or a shared aperture. Although it would be possible to have separate aperture blocks 103 that either transmit or receive and construct a terminal 101 from both, that would place more constraints on the assembly of the blocks to form a functioning terminal, since the right proportion and arrangement is required.

An antenna aperture 105 that supports multiple transmit and receive beams simultaneously is highly desirable, since the terminal 101 as a whole could then support multiple beams to allow connections to multiple satellites simultaneously. This is desirable to allow more resilient communications through multiple ground gateways or to selectively route communications through two different networks with different bandwidth or latency or data security characteristics. In addition, the new constellations of NGSO (Non-Geostationary Orbit) satellites, including those in LEO (Low-Earth Orbit), MEO (Medium-Earth Orbit) and HEO (Highly-Elliptical Orbit), are benefited by terminals with multiple beams from the same aperture that can allow seamless make-before-break handovers.

The interconnection ports 107 between aperture blocks 103 are used for all data and power transfer between the different blocks. Although multiple methods of implementation are possible, including conventional ports, plugs, headers, and/or cables, any solution that involves exposed contacts or holes is susceptible to damage or becoming inoperable due to dirt, grease, moisture, or any number of environmental contaminants or conditions. For this reason, one embodiment of the disclosure uses short-range high-speed wireless links for data and inductive coupling for bulk power transfer, as illustrated in FIG. 2, where a magnified view from the side FIG. 2(a) and top FIG. 2(b) are demonstrated.

In all cases, the implementations of the interconnection ports 107 must be symmetric across the geometric center line to allow for identical ports on neighboring blocks 103 to interface. For example, a single power transformer coil 205 should be centered within the port 107, while posts 203 and holes 201 intended to interface with each other from neighboring blocks should be symmetric about the centerline.

In one embodiment, the outer cases or housings of the aperture blocks 103 are sealed, with no holes or perforations. For alignment, the ports 107 (including power and data transfer capability) include alignment features that are formed by symmetric alignment and mounting holes 201 and posts 203 that align the aperture blocks 103 as they are brought together.

In one embodiment, as shown in FIGS. 1, 2, the holes 201 of the ports 107a are recessed inward from the side edge of the block 103. The holes 201 have a first side wall 202, a second side wall 204, and a bottom surface 206 formed between the first and second side walls 202, 204. The side walls 202, 204 can be angled to be tapered outward so that the opening at the top of the hole 201 is larger than the bottom 206 of the hole 201, to allow simple alignment between the blocks 103. As best shown in FIG. 2(a), the hole can be circular or oval in shape, but can also take on other shapes, such as substantially square or rectangular.

The posts 203 have a mirrored geometry to the holes 201, to allow the posts of one block 103a to engage with the holes of a second block 103b, and vice versa. The posts 203 project outward from the side edge of the block 103. The posts 203 have a first side wall 208, a second side wall 210, and a top surface 212 formed between the first and second side walls 208, 210. The posts 203 form a base at the side edge of the block 103. The side walls 208, 210 can be angled to be tapered upward so that the top surface 210 is smaller than the base. As best shown in FIG. 2(a), the post 203 can be circular or oval in shape, matching the shape of the hole 201.

The holes 201 and posts 203 are angled and shaped so that the holes 201 and posts 203 slidably interconnect and mate with the respective posts 203 and holes 201 of a neighboring aperture block 103, as shown in FIG. 1. Thus, for example, the side walls 202, 204 of the hole 201 slidably receive the side walls 208, 210 of a neighboring mating block post 203. When fully mated, the top surface 212 of the post 203 contacts with the bottom surface 206 of the hole 201, supporting either direct electrical engagement of contacts, inductive coupling between power-transmission transformer coils, and/or wireless data transmission via adjacent transceivers within the holes 201 and posts 203 respectively.

As further shown in FIG. 1, the second side wall 204 of the hole 201 can be continuous with the first side wall 208 of the post 203. Accordingly, the post 203 of one block can slide along the first side wall 208 of a neighboring block and along the second side wall 204 of the hole 201 to be received in the hole 201. In another embodiment shown in FIGS. 2(a), 2(b), the hole 201 and post 203 can be separated slightly to form a bridge 214 therebetween.

Powerful magnets 209a and 209b are aligned with appropriate polarization within the holes 201 and posts 203 to hold the modules together. In addition, electronic components, such as short-range high-frequency communications components such as microchips 207a, 207b (see e.g., Keyssa technology, www.keyssa.com, © 2021 Keyssa, Inc.) are mounted in each of the holes 201 and posts 203, passing traffic wirelessly between two aperture blocks 103 via the ports 107.

As shown in the embodiment of FIGS. 2(a), 2(b), a first magnet 209a is mounted at the center of the interior surface (i.e., inside the hole, internal to the block body) of the bottom 206 of the hole 201, such as recessed in the bottom 206 of the hole 201 and substantially flush with the bottom surface 206 of the hole 201. And a first electronic device or component 207a is mounted just to the side of the first magnet 209a at the interior surface of the bottom 206 of the hole 201, such as recessed in the bottom 206 of the hole 201 and substantially flush with the bottom surface 206 of the hole 201. And, a second magnet 209b is mounted at the center of and recessed within the outside surface of the top 212 of the post 203 to be substantially flush with the top surface. And a second electronic component 207b is mounted just to the side of the second magnet 209b and recessed within the outside surface of the top 212 of the post 203 to be substantially flush with the top surface.

The first and second magnets 209a, 209b attract each other. Accordingly, as the post 203 is being slidably received by the hole 201, the magnets 209a, 209b exert an attractive magnetic force that draws the post 203 fully into the hole 201 to fully engage the neighboring blocks with one another and to maintain the engagement of the neighboring blocks. In addition, a user can pull the neighboring blocks apart, if desired.

The first and second electronic components 207a, 207b are positioned to align with a respective mating component 207b, 207a of the neighboring block. Once the neighboring blocks are fully engaged, the first and second electronic component 207a, 207b are aligned with each other and communicate via a short-range wireless channel, such as via ultra-wideband transceivers or inductive or capacitive coupling without electrical contact. In one embodiment, the magnet 209a and/or the electronic component 207a can be recessed at the outside surface of the hole 201 to be substantially flush with the inside surface of the hole 201. The magnets 209a, 209b can also be located internal to the block body and exert a magnetic force that extends through the block body into the hole or through the post top.

Depending on the capability of the chip 207, each of these chips may pass bidirectional traffic, or may transmit data in only one direction, with data transmitted through the hole 201 and received through the post 203, or vice versa. When the two aperture blocks 103 are aligned and interfaced via the holes 201 and posts 203, the magnets 209 hold them together with the appropriate tolerances such that the communications chips are correctly aligned for proper operation. The magnets 209 and communications microchips 207 are inside the hermetically sealed block case or housing, and are not visible from outside the aperture block. The magnetic coupling and data transfer are accomplished through the magnetically- and RF-transparent (polymer) housing, or through RF- and magnetically-transparent windows within a non-transparent housing. The ports 107 coexist within the sealed case or housing of the aperture block 103 with the aperture 105. The data to be exchanged includes low-speed control, calibration, and health information, as well as the high-speed digitized waveform data for each receive and transmit beam to be carried by the terminal 101.

A power transfer mechanism 205, such as an inductive coupling loop or transformer is used to transfer power between the blocks 103 forming the terminal 101. Power transfer between aperture blocks 103 allows for embedded batteries to be charged from a single external power connection, or for operational power to be provided to the entire array in the case where no batteries are included in each aperture block. The mechanism 205 can be an open coil of wire or a wire-wrapped ferrite core in linear or half-circle configuration to increase the transfer efficiency of the coil. The use of wireless communications and wireless power transfer between blocks increases the power requirements of the array over and above the direct needs of the terminal; optimizing the power transfer efficiency as much as possible is important for minimizing the power consumption as much as possible, increasing the battery life or decreasing the number of batteries required. In the embodiment shown, the power transfer mechanism 205 can be mounted to the bridge 214 between the hole 201 and the post 203.

As alternate alignment features instead of magnets 209 (FIGS. 2(a), 2(b)), mechanical devices can be provided at each hole 201 and post 203 that removably and reliably connect the hole 201 and post 203 with the post 203 and hole 201 of a neighboring block, and at the same time provide an electronic connection between the electronic components 207a, 207b. For example, one embodiment of the interconnection port 107b is shown in FIGS. 2(c) (side view) and 2(d) (top view). In this implementation, one or more posts 241 replace the post 203 and one or more slots 243 replace the hole 201 and are configured to mechanically register the locations of the neighboring aperture blocks 103, and allow for a flexible clip 245 in one aperture block to removably connect with a mating slot 247 in the other aperture block.

As shown, the posts 241 can be spaced apart from the slots 243, for example at opposite ends of the block 103 and separated by other components at the side edge or surface of the block, such as light sources 257 and/or receivers 259. In the embodiment of FIG. 2(c), two posts 241 and two slots 243 are shown, though any suitable number can be provided. Whereas in the embodiment of FIGS. 2(a), (b), the hole 201 and post 203 are adjacent to one another at a same area at the side edge or surface of the block 103 without components located at the surface therebetween (it is noted that the power transfer 205 is recessed at or beneath the surface), Though the posts and slots are shown at facing edges of the block 103, they can be at a positioned anywhere on the block such as at the top and/or bottom surface. In yet another embodiment, one or more of the light sources 257 and/or light receivers 259 can be positioned to the outside of the respective post 241 and/or hole 243.

In one example embodiment, a mating feature such as a catch or button 249, can be integrated with the mating slot 247 and used to engage and disengage the mechanical clip 245 and allow the two aperture blocks 103 to be removably connected and disconnected. The use of mechanical clips 245 may be preferable over magnets 209, as the structure can be made more robust and rigid when connected and protecting against accidental disconnection, but requiring more effort to connect and disconnect. The use of mechanical clips increases the rigidity of the assembled terminal 101, and (for example) might allow the assembled terminal 101 composed of a number of aperture blocks 103 to be placed such that it is supported only from the edges, such as when tilted at an angle by resting on a stand or rock, thus increasing the operational flexibility of the terminal.

In this implementation, a PCB-integrated ferrite transformer coil 205b is used to transfer power in either direction between the two aperture blocks, preferably a ferrite pot core to contain the fields of the transformer and increase efficiency. A PCB-integrated planar ferrite core that uses traces on the PCB for the field windings of the transformer is a good solution, since the resulting transformer can have a very low profile and minimize the size and mass required for a given power transfer. Circuitry integrated into the interconnection port 107b would monitor the transformer and indicate when a neighboring block was installed and available to deliver or receive power. The circuitry would then configure the interconnection port 107 to either receive power, deliver power, or neither through the transformer depending on the requirements of the system.

In the embodiment of FIGS. 2(c), 2(d), data transfer is accomplished through optical devices. One or more high-speed light sources 257 are excited by circuitry to carry a signal in one aperture block 103, the resulting light would then be received by a matching and aligned one or more light receivers 259 in the other aperture block. In this implementation 107b, light sources 257 and receivers 259 replace the high-speed data interfaces 207a, b within the port 107 for transferring data between blocks 103. Each aperture block would have both light sources 257 and light receivers 259 to both send and receive data, respectively, through the interconnection port 107b. An example implementation would use an LED 255 coupled to a corresponding light pipe or light guide 256 to drive the light source 257, and a photodiode or phototransistor sensor 254 coupled to a corresponding light pipe or light guide 258 to detect the light received by the light receiver 259. In this case, the light guides 256, 258 would be used to couple the light from the LED 255 and sensor 254 to the source 257 and receiver 259 while the LED 255 and sensor 254 are installed on a printed circuit board 253 internal to the aperture block 103. Stated otherwise, the light sources 257 and light receivers 259 can be positioned at the end surface of the block, and the LED 255 and phototransistor 254 can be located within the block and connected by guides 256, 258, respectively. With a high-speed LED 255 and photodiode 254, high data transmission rates can be achieved, with additional pairs of sources 257 and sensors 259 added to support even higher rates as might be required for broad instantaneous bandwidths or multiple simultaneous beams. The outer surfaces of the light guides 256, 258 must be at least relatively dean in order to transfer light, but the surface design of the sources and sensors 257, 259 can be designed to avoid trapping dirt or other contaminants so that the surface can be quickly cleaned.

In another embodiment, the interconnection port 107c is shown from the side in FIG. 2(e) and the top in FIG. 2(f). In this implementation, alignment features such as pegs 241 and slots 243 are configured to mechanically register the locations of the neighboring aperture blocks 103. Embedded recesses 285 in the housing are then included to allow an external retaining clip or snap to be installed to hold the neighboring blocks 103 together. The benefits of an external clip are the ease of installation and the tension that it can withstand when connected can be controlled better.

In this implementation, electrical contacts 283 are used in each interconnection port 107c for power transfer between the aperture blocks. The benefits of direct electrical contacts are increased power transfer efficiency over a transformer-based approach and therefore reduced overall power draw and reduced heating, as well as increased design simplicity and reduced cost. However, exposed contacts must be protected from moisture and contaminants, and this can be performed with an integrated cover, such as a flexible silicone lid 281 over the port 107 that can be removed for installation and replaced for storage and transport. Similar to the power transfer, data signals may be carried by electrical contacts 287, 289, with the same benefits and costs. In this implementation 107c, plugs 287 and sockets 298 replace the high-speed data interfaces 207 a, b within the port 107 for transferring data between blocks 103.

The different options discussed for the alignment and mechanical mounting between aperture blocks 103, power transfer between blocks 103, and data transfer between blocks may be applied in different combinations, and not only those illustrated as examples here.

Figure 3A:
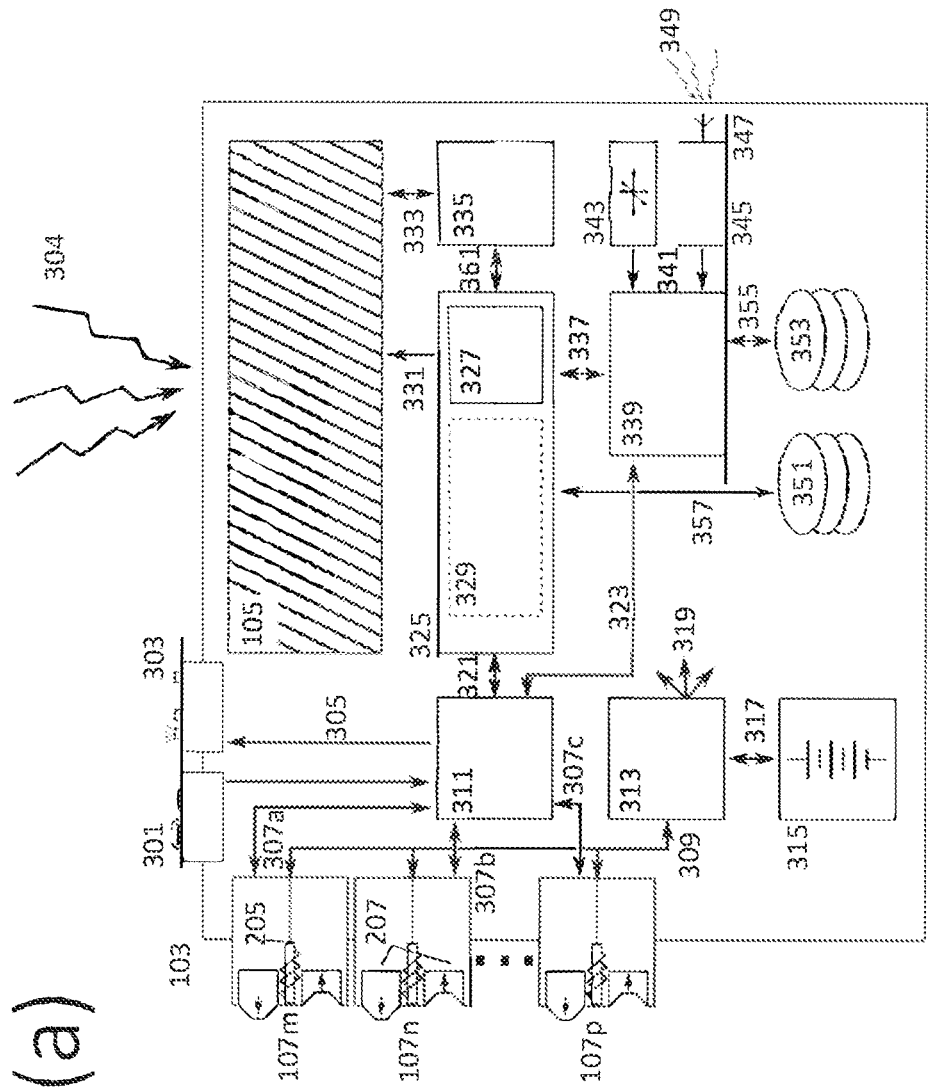
FIG. 3(a) shows a block diagram of a single antenna aperture block.

FIG. 3(a) illustrates one embodiment of the functionality and subcomponents of the aperture block 103, including any of the implementations shown in FIG. 1 or FIGS. 2 (a)-(f). The general aperture block 103 contains a plurality of interconnection ports 107, where they would be geometrically located around the perimeter of the block where appropriate interconnect to neighboring blocks 103 of the terminal 103. The physical arrangement of blocks 103 may be a uniform arrangement with all blocks identically arranged (as would be the case with squares) or may involve rotations with only some ports 107m of some blocks able to interconnect with specific ports 107n on neighboring blocks 103.

The physical user interface on each block has a plurality of input buttons 301 and indicator lights 303, located where both would be physically accessible while the array is connected and operational. The location could be on one or more of the sides, or the front or rear face of the aperture block, depending on the application and installation case. Multiple sets of input buttons 301 and lights 303 could be located around the aperture block 103 to allow for easy access in different arrangements and orientations. Control and configuration of the blocks 103 and the terminal 101 overall is performed primarily using external control (such as a software application running on an end-user device, or the modem, or a virtual control panel running as a web application hosted on the terminal) rather than the physical interface 301 and 303, which can be used for simple activity such as power-on and power-down.

The data to/from the interconnection ports 107m, n, p through the high-speed data interfaces 207 and the user interface 301, 303 are both directly connected via transmission lines 307 and 305, respectively, to the communications controller 311, which might be implemented as a microcontroller or similar device responsible for managing the data entering and leaving the block 103. The power transfer mechanism 205 of the interconnection ports 107 are connected to and controlled by the power manager 313, which controls the flow of power between blocks 103 via power line 309, manages and charges the batteries 315 (while power is supplied from one of the ports 107m,n,p) via the unregulated supply lines 317, as well as supplies regulated power from the batteries 315 to the rest of the block electronic components via power lines 319. The power manager may use data transferred between blocks via 207 to change the flow of power through the power transfer mechanism 205.

The Antenna aperture 105 is a segment of a phased array or other variety of electrically-steered antenna (ESA) selected for power efficiency and ability to operate in discrete blocks that receives and generates the satellite signals 304. This might be, for example, a conventional patch antenna phased array in a rectangular, triangular, or irregular grid, an array based on digital or analog beam-forming and phase shifting, or an array based on liquid crystal or other tunable material. The block 103 can utilize any electrically-steered antenna, but is especially useful with antenna having reduced power consumption, such as in U.S. Pat. No. 10,116,051, the entire content of which is hereby incorporated by reference. The benefits of this system for a conventional phased array antenna include that the aperture can be broken into smaller pieces and is therefore more transportable and yields more flexibility in applications since larger or smaller apertures can be constructed and operated on-demand.

The state and operation of the ESA is controlled via control signals 331 by the antenna control logic 327 running on the data processor 325 (e.g., implemented as a FPGA (Field-Programmable Gate Array) or SoC (System on Chip)). The RF or IF signals 333 (which may be digital or analog signals) to/from the aperture 105 are passed to the DSP processor 335, which performs filtering, processing, time and phase shifting, and data combinations on the received and transmitted signals, including combining the signals with data from neighboring blocks 103 through the interconnections ports 107 and communications processor 311. The processed data 361 is then passed to the data processor 325, which works with the data depending on the configuration of the array. The overall combination of components in the block is novel to a single aperture block, along with the combinations such that multiple blocks are combined and operate jointly is novel.

The data processor 325 works very closely with the orchestration processor 339 to control the operation and state of the array. The data processor 329 handles the real-time signal processing and control operations, while the orchestration processor 339 is the primary controller of the block, and manages the communications flow 323, 321 from block 103 to block, decides power allocation between blocks and components of a block, configures the data processor 325 via 337, manages and integrates the sensor data 341 from the Inertial Navigation Unit 343 and GNSS receiver 345, stores and retrieves configuration data 355 from memory 353, coordinates behavior and operation with the orchestration controllers 339 of other interconnected blocks 103, and ultimately controls the user interface and configuration through the data ports 107 or on-board interface 301, 303. The GNSS antenna 347 receives GNSS signals (i.e., GPS) 349 and passes those signals to the GNSS receiver 345, which provides position and time data to the orchestration processor 339 that runs the antenna controller and sets the pointing direction of the terminal to a given satellite based on the terminal's location and orientation.

The data processor 325 is implemented using reconfigurable hardware (such as an FPGA) so that the functionality and features of each block can be modified by software. When a terminal 101 is assembled and in operation, one of the constituent blocks 103 will be selected automatically to be the master or primary block from which the other slave or secondary blocks will be controlled, one will be selected to act as the modem, one will be selected to act as the antenna control unit (ACU), and so forth for the functions for which only one instance is needed. In some cases, a single block may act in multiple roles simultaneously. Any block 103 that is not selected to act in a special way acts as a standard block, which optionally receives data comprising digital samples of a received waveform from neighboring aperture blocks from its ports 107, processes that digitally sampled waveform data along with the digitally processed waveform data 361 to produce a combined sampled signal from its own DSP processor 335, and forwards the combined digitally processed waveform data from the current block 103 as well as the neighboring blocks to another port 107.

Data received by the antenna apertures 105 is summed together in a distributed fashion by all of the aperture blocks 103 before being routed and combined in turn by neighboring blocks 103 until the final, total data representing the satellite signal received by the entire terminal 101 reaches the specific block 103 acting as the modem (or holding the interface to the external modem). Each of the blocks 103 is capable of acting as any of the roles by loading a respective FPGA or software image 357 from the image storage 351, which contains images for all of the features and functionality that is required. Some functionality 327, which is the control logic for the aperture 105, is included in every aperture block 103, where the remaining unallocated capacity 329 on the data processor 325 is configured dynamically in each block at array setup time based on the needs of the terminal. The unallocated capacity 329 is used to implement the control processes on the primary block, the modem functionality, and the antenna control unit (ACU) functionality on the selected aperture blocks 103.

Although FIG. 3(a) shows a large number of features and subcomponents included in the aperture block 103, there is the option for some to be regarded as optional or only be included in different variants of the aperture block to save costs. For example, some modules could contain the battery unit 315, others the FPGA processing block 325, and others the GNSS receiver 345; then, as long as at least one aperture block in the array contained each of the required features, the array would function. This would reduce the cost of each block by reducing the installed components, but would multiply the number of aperture block variants and increase the risk of missing an essential element when assembling a terminal, reducing the flexibility of the installation and configuration. For this reason, the preferred embodiment is for each aperture block to contain all illustrated features and functionality, so that the aperture blocks 103 are interchangeable, and any combination of blocks can be used to form a functioning terminal.

Figure 3B:
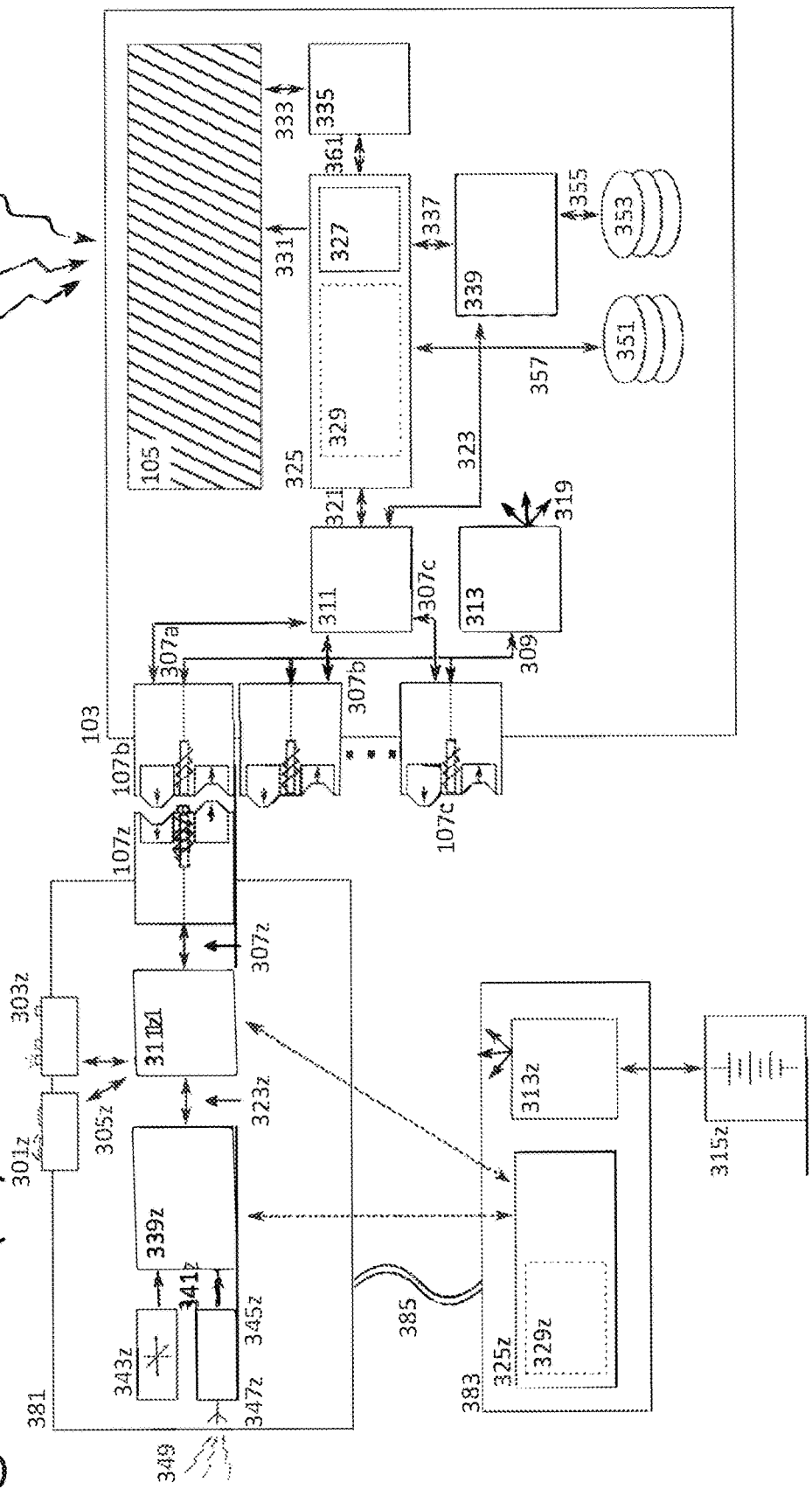
FIG. 3(b) shows a block diagram of an alternate implementation of a single antenna aperture block with associated external modem and power supply functionality.

Accordingly, FIG. 3(a) shows a fully self-contained implementation with batteries and a controller embedded so that there are no single points of failure. FIG. 3(b) shows a simplified option that requires dedicated external hardware (controller, modem, power), but reduces the cost, weight, power of the antenna overall. Thus, FIG. 3(b) shows an alternate implementation of the functionality and subcomponents of the aperture block 103, where components that would only be required in a single block 103 of the terminal are removed to an external user interface block 381, modem & antenna controller block 383, and external battery pack 315z. In this alternate implementation, features such as the battery 315, physical user interface 301, 303, Inertial Navigation Unit 343 and GNSS receiver 345 are omitted from the terminal block 103 and instead installed externally. In this way, the cost of the aperture blocks is reduced, since only one aperture block 103 in an array requires a user interface or GNSS receiver, for example.

The external user interface block 381 then connects to an aperture block 103 via an interconnection port 107 (transferring power via 205 and control and digitally sampled waveforms via 207) in the same way as two aperture blocks 103 might be connected. A communications controller or processor 311z receives and transmits over lines 307z signals from/to the port 107z, and also interfaces over lines 305z with the user interface components 301z, 303z. An orchestration processor 339z receives input 341z from the IMU 343z and GNSS receiver 345z, which operates with a similar antenna 347z and GNSS signals 349 as when installed in the aperture block 103. The GNSS receiver 345z, IMU 343z, and user interface 301z and 303z must be directly attached to an aperture block 103 to ensure that the position and motion data is directly relevant to the antenna aperture for calibration purposes.

Additional processing capacity 325z for the modem functionality running via a data processor 329z and an overall power supply 313z may be optionally connected via a cable 385 to another block 383 that could be suitable for carrying in a backpack or other convenient method. An external or integrated high-capacity battery pack 315z would also be available to be carried in a similar convenient fashion.

The benefit of this alternate implementation as illustrated in FIG. 3(b) over that illustrated in FIG. 3(a) is that the mass and cost of the aperture block 103 is reduced due to common functionality being included in a single external block 381, rather than in every aperture block 103. That, in turn, enables use of a traditional phased array or other electronically-steered antenna (such as a lens array antenna) to be used in a manpack configuration. A separate user interface 301z, 303z also allows controlling the assembled antenna 101 from further away. It is noted that any one or more of the operational components 311, 313, 325, 329, 327, 335 can be a processing device, such as a processor, controller or ASIC. The components 311, 313, 325, 329, 327, 335 can be separate or combined into one or more integrated processing devices. Any combination of 103, 381, 383 may be carried by a single individual in a backpack or other container, with other items 103, 381, 383 being carried by others, and the terminal assembled when required.

Figure 4:
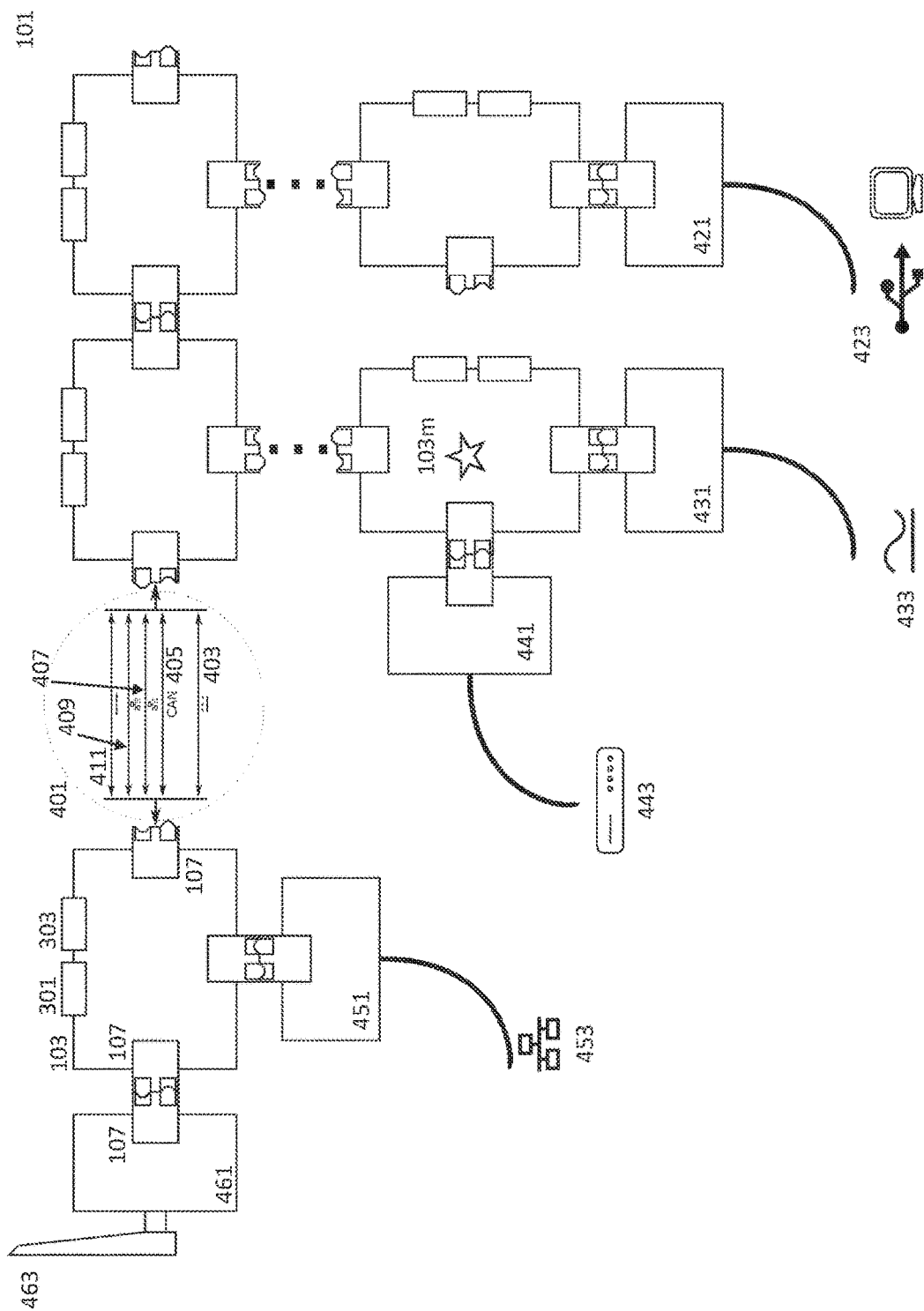
FIG. 4 shows a block diagram of the electronically-steered modular terminal.

FIG. 4 demonstrates how the aperture blocks 103 interconnect via their ports 107 to form a representative terminal 101, with associated accessories 421, 431, 441, 451, 461 connected using the same ports 107. One of the blocks 103 may be selected jointly by the orchestration processors during startup to be the primary block 103m, based on a set of criteria that might include proximity to the other blocks and relevant accessories to minimize the complexity of data transfer within the array, battery levels, etc. Or, an external user interface block 381 with associated modem block 383 may be connected.

The ports 107 can be viewed as having multiple internal connections or data streams, as shown in the magnified view of the transferred signals 401, which can be communicated for example via the interface 207. The ports 107 can pass power 403 bidirectionally, in response to the commands issued by the orchestration processor 339 and power controller 313 of each of the blocks, under the command of the orchestration processor 339 of the primary block 103m. For example, if external power 433 is being supplied by a power accessory 431, then the availability of that accessory will be reported to the primary block 103m, which will then coordinate power transfers from the external power accessory 431 through to the rest of the connected blocks 103.

Multiple parallel data streams are supported by the interconnection ports 107, specifically the communications devices 207. These may be carried over separate physical channels, contacts, or communications chips, or may be multiplexed into one or more underlying physical data streams. Low-speed command and control signals 405 are used for orchestration and low-rate communication and control throughout the array using a CAN (Controller-Area Network) or similar. A management 10/100/1000 ethernet network 407 or similar with dynamic routing within the connected elements is used for higher-speed communications and control, including beam-pointing instructions from the antenna control unit, modem command and control signals internal or external to the terminal, and management, programming, and configuration of the terminal and individual blocks from an external computer. A user data 10/100/1000 ethernet link 409 carries the user traffic from the modem through the array to one or more accessories for access by the user, such as a local wireless access card 461 with a wifi or Bluetooth antenna 463, an ethernet adapter accessory 451 to connect to an external ethernet network 453, or an adapter 421 to connect via USB or other connection to an external computer, radio, or other device 423.

Finally, a high-speed synchronized packet line 411 carrying the sampled RF signal data 305 to and from the antenna apertures 105 and DSP processors 335 in the attached blocks 103, or out of the terminal altogether through a modem port 441 to pass the digital data (potentially converted to an L-band IF signal) to an external modem 443 (which may be desirable in some use cases).

This flexible architecture allows terminals to be customized in size and applications by connecting different accessories. Depending on the desired applications and use cases, the functionality of some of the accessories could be integrated into the modules 103 themselves under sealed covers (i.e., enclosed by a module housing); for example, providing a single ethernet port on each module that would provide external connectivity for the management and data networks, power via power over ethernet for charging, and interconnection to a computer. Whether using a separate accessory 421, 431, 441, 451, 461 through the sealed magnet-mount data ports 107 or including the functionality in the aperture block 103 itself depends on the use cases and requirements for the terminal system as a whole. Additional accessory types are also possible, including data storage, external batteries, chargers for external devices to make use of the batteries internal to the aperture blocks 103, etc.

An implementation of this disclosure places a number of constraints on the shape and size of the aperture blocks 103. The larger the blocks 103, the fewer are required to be interconnected to achieve a given communications performance, but the individual blocks are bulkier and heavier, thus complicating transport. Smaller blocks 103 require more blocks to be interconnected, increasing the time taken to assemble and disassemble, but might allow more blocks to be distributed to more individuals within a group to distribute the transport, thus making some level of communications available to more individuals within the group, no matter how separated they might become or into which subgroups they are separated at a moment in time. The shape of the blocks should be such that they may be tiled or tessellated in arbitrary numbers to form arbitrarily large or small arrays. Because there will be gaps, even small, between the antenna apertures 105, supporting aperiodic tilings or rotationally-symmetric rather than translationally-symmetric tilings of aperture blocks are desirable. Aperiodic and asymmetric tilings are preferred since periodic or symmetric structures can possess undesirable characteristics in the sidelobes of the resulting overall antenna beam.

FIG. 5 shows three possible implementation shapes for an aperture block 103, namely a triangular block 103x in FIG. 5(a), a square block 103y in FIGS. 1, 5(b), and a hexagonal block 103z in FIG. 5(c). Many triangular configurations are possible, but a particularly desirable option is the triangle of which five triangular blocks 103 form a regular pentagon, with interior angles of the triangular block 103 of 72, 54, and 54 degrees. This specific triangle tiles into a regular polygon with no reflectional symmetries, and can be tiled into a large number of different irregular polygons and other shapes with primarily rotational symmetry. This is highly desirable compared to the periodic arrays that are achievable when using the square 103y or hexagonal 103z options. Triangles that form regular polygons with a small, odd number of sides are more likely to produce desirable tilings or tessellations than others (such as equilateral triangles that naturally form regular hexagons with six sides). Another option is irregular pentagons, of which there are 15 families that are capable of tiling the plane with a single shape (see Wolchover, Pentagon Tiling Proof Solves Century-Old Math Problem); however, the more complex the shape, the more challenging for the end user to tile into an appropriate and workable array. Other shapes are also possible, including the options that allow for multiple shapes of aperture blocks to be tiled together.

In the case where the shape of the aperture block 103 has multiple edge lengths (like the triangle 103x), then the interconnection ports 107 in the long and short edges can have different sizes or orientations to ensure that the blocks can only be assembled in a compliant way.

Figure 6:
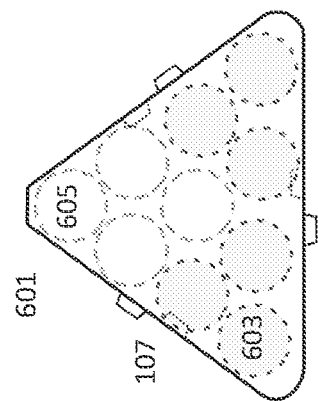
FIG. 6 shows an aperture block constructed using a lens antenna array as the electrically-steered antenna aperture.

Rather than a conventional phased array or electrically-steered antenna, the antenna aperture 105 can be implemented using a lens array as described in U.S. Pat. No. 10,116,051, which is especially useful for lenses that are substantially flat (e.g., non-spherical) to form a phased array. FIG. 6 demonstrates how an array of transmit 605 and receive 603 lenses might be tiled within a triangular aperture block 601. The lenses 603, 605 are shown as being circular, but can be hexagonal (as in U.S. Pat. No. 10,116,051) or any other suitable shape and size. The ratio of transmit to receive lenses can be varied to adjust the overall array performance. The aperture 105 could also be implemented by combined receive and transmit lenses supporting either full- or half-duplex operation to optimize the gain of the terminal 101 in either mode for a given number of blocks. The benefits of the lens array over a conventional array antenna is that the power consumption and heat generation is lower, which is critical for a battery-operated application, and the component count is much reduced.

In addition, capabilities for simple extension to multiple beam operation for NGSO are included. FIG. 7 then illustrates how these blocks can be tiled together to form arrays of a single 701 (FIG. 7(a)), five 703 (FIG. 7(b)), ten 705 (FIG. 7(c)), and twenty 707 (FIG. 7(d)) aperture blocks.

Figure 8:
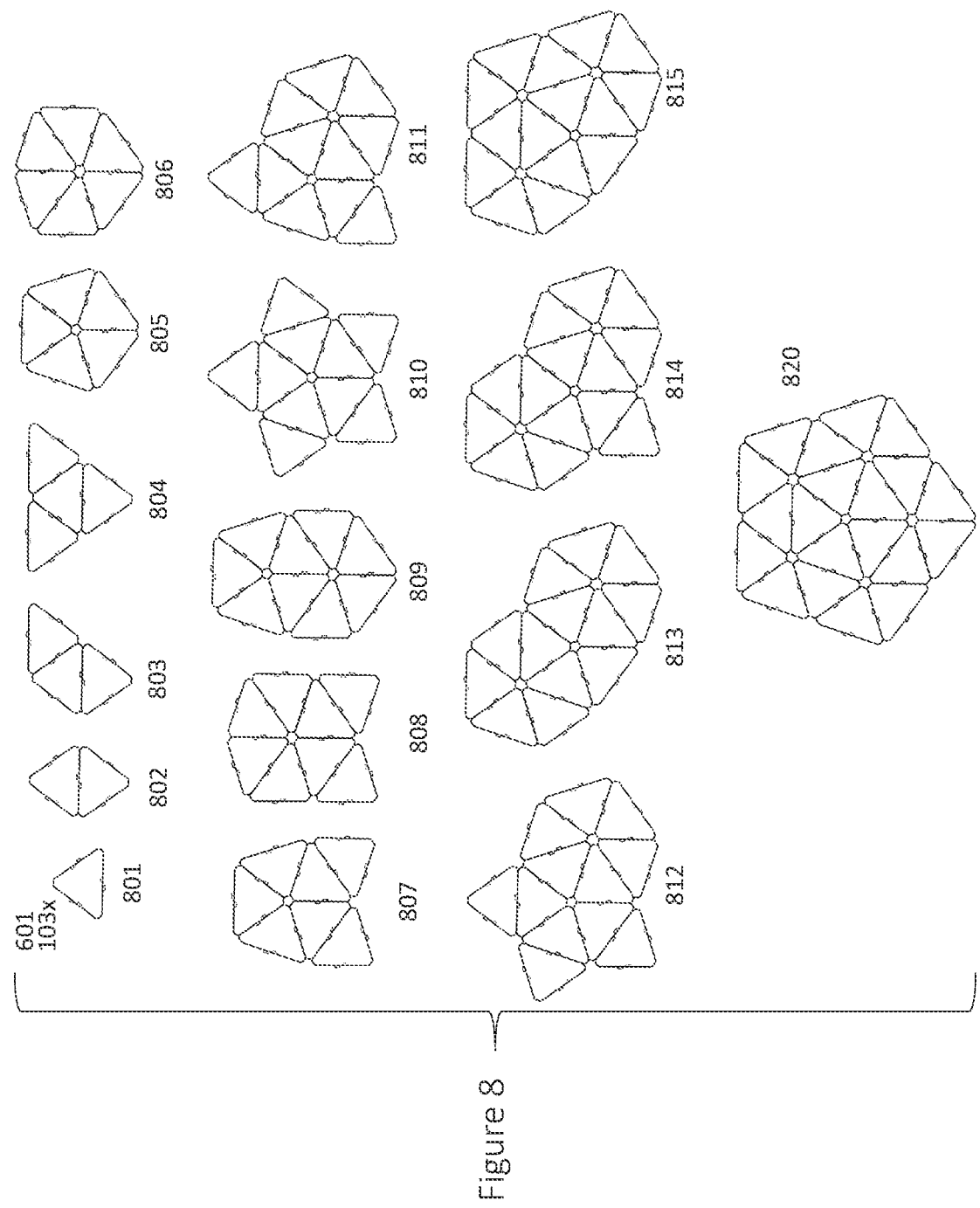
FIG. 8 demonstrates how the aperture can grow with arrays constructed of varying numbers of aperture blocks.

To demonstrate the level of flexibility to work with an arbitrary number of aperture blocks. FIG. 8 demonstrates array terminals composed of 145 elements 801-815, and 20 elements 820. These are representative tilings—other arrangements area possible and acceptable. In general, the denser the tiling the more practical. The benefit of supporting many filings with different shapes is that any number of elements 103 may be combined to form the terminal 101, and they may be combined in many ways, simplifying assembly; as long as the module can fit, it can be installed and function.

Figure 9B:
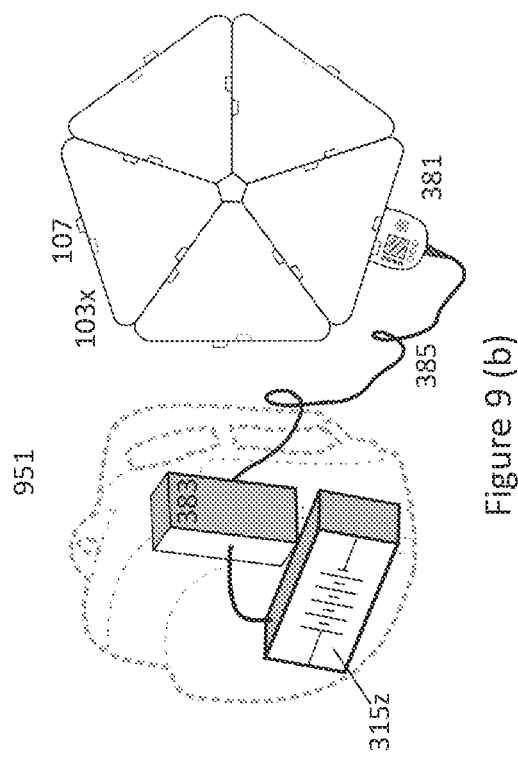
FIG. 9(b) shows an assembled terminal with external interface module, power, and modem blocks.
Figure 9A:
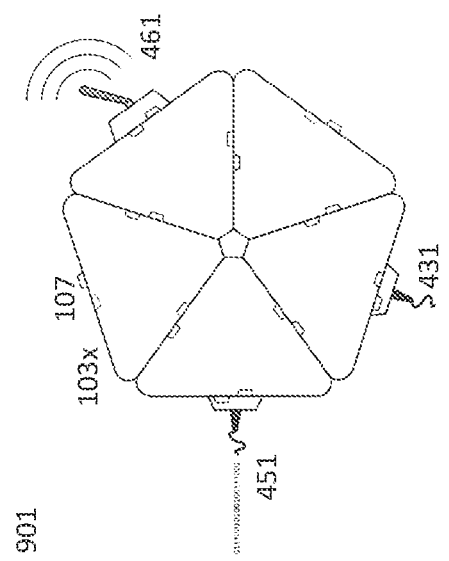
FIG. 9(a) shows an assembled terminal with accessories.

FIG. 9(a) shows a representative terminal 901 assembled from five triangular aperture blocks 103x assembled in a regular pentagon. Three accessories are shown assembled on the device—a power adapter 431, a data cable 451, and a local wireless adapter 461. This is one of many potential configurations that is achievable using the blocks and accessories described previously (e.g., with the angles 72, 54, and 54 degrees). For clarity, the accessories, such as adapter 431, cable 451 and adapter 461, are on the outside of the triangular block 103 housing, such as coupled to the block 103 at the port 107; though in other embodiments the accessory can be integral with the block 103.

FIG. 9(b) shows another embodiment of the terminal assembly 951 that connects five triangular aperture blocks 103x to an external user interface block 381, which is connected via a cable 385 to the modem block 383 and external battery 315z. The modem block 383 and external battery 315z are shown superimposed on a backpack to illustrate that those components need not be unpacked in order to connect them to the antenna array 951, easing quick setup and breakdown of the system.

Figure 10:
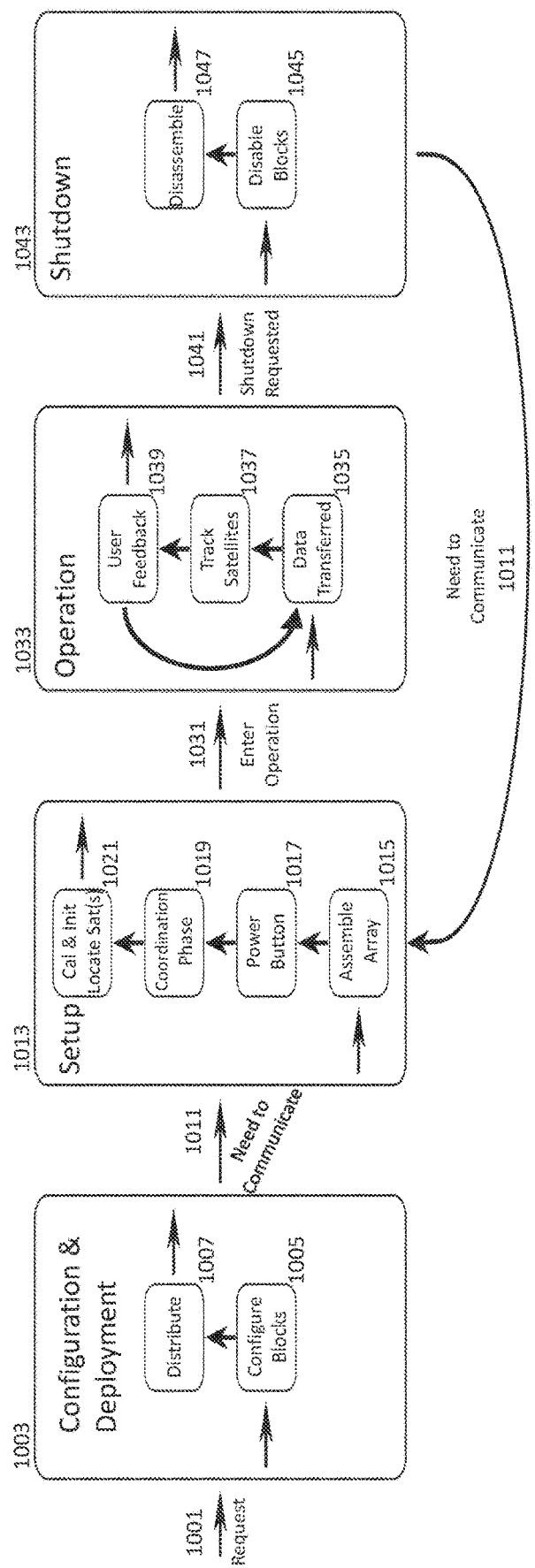
FIG. 10 is a workflow diagram illustrating the setup and operation of the terminal.

FIG. 10 illustrates the operation flowchart of the terminal 101. Beginning with a request 1001 for a terminal to be deployed, a terminal is first configured 1003. A plurality of aperture blocks 103 and any associated accessories (including external user interface 381 or modem blocks 383) are jointly inspected, optionally have their batteries (if any) charged, and configured 1005 with the same satellite, modem, and operational settings and any required credentials to be able to connect to provisioned capacity on the network. Once a set of blocks are configured appropriately before departing to the field, then any combination or subset of the blocks 103 may be combined to form an operational terminal. Then, the blocks with any allocated accessories are distributed 1007 to the end users.

In the field, when the end users have a need to communicate 1011, the terminal is assembled and setup 1013. First, the blocks and necessary accessories must be unpacked and assembled 1015 into an array, with the documentation illustrating preferred arrangements, to form a single connected unit on the ground or other flat surface. Here, one or more of the blocks 103 are physically connected together by connecting the mating posts and holes to form a continuous block assembly, and optionally attaching an accessory to one or more of the blocks.

When the blocks 103 are assembled and all accessories connected, step 1015, the end user then presses 1017 the power button 301 on any one of the connected units. This triggers the coordination phase 1019 of the setup process, in which the set of connected blocks 103 jointly communicate by means of the ad-hoc mesh network of port connections in which they are assembled to identify the number, orientation, and geometry of connected blocks, identify any of the connected accessories, and select one of the blocks to be the primary block 103m. The primary block is selected based on configurable metrics such as proximity to the modem, central position within the array, or battery charge level. This process is performed on each block 103 by the orchestration processor 339. Temporary addresses for each block 103 are mutually determined according to their locations within the array to facilitate communications. For example and with reference to FIG. 9(a), block 103x might be chosen as the primary block of the array 901. In this case, addresses might then be determined in a breadth-first traversal manner through all connected ports 107 of each connected block in the array 901. The primary block would be assigned address 1, the blocks (if any) attached to each of the ports then assigned addresses 2, 3, 4. In array 901, only addresses 2 and 3 are used for the blocks to the left and right respectively. The remaining blocks would be addressed in the same manner. Command and control signals can then be sent and received between blocks that are not directly connected through messages being forwarded by intervening aperture blocks. The status of this process and any faults are reported via the status indicators 303.

After the primary block is selected, it then takes control (run specifically by the orchestration processor 339) over the communications and configuration of the array in the calibration and initialization phase 1021. Based on the geometry and orientation information determined earlier, the primary block 103m establishes power, signal, and data routing paths throughout the array, simplifying the mesh network topology to a defined set of connections. The terminal as a whole 101 then self-calibrates under the control of the primary block 103m, loading calibration coefficients from storage and performing self-checks to confirm that all connections are secure. Each block computes the relative orientation and offset distance to its neighbors independently, and the terminal under the control of the primary block 103m uses a consensus approach to compare the calculations by different blocks 103 to arrive at a single value for each interface in the terminal 101. The computed orientation and offset are then used by the calibration routines to correct the phase settings for each block to ensure accurate beamforming by the array as a whole.

A block or blocks are selected to act as the antenna control unit (ACU) and the modem, unless an external modem accessory 443 or external modem block 383 and external user interface 381 are installed, in which case the digitized waveforms or signals are routed to/from the external modem accessory or external modem block. The location and overall orientation of the terminal relative to the earth and the satellite is determined using the INU 343 and GNSS sensors 345 on one or more of the connected blocks under the control of the orchestration processor 339 of the primary block 1203m, and at least one beam is formed to connect to at least one satellite, based on the configuration data loaded during the configuration phase 1003.

A beam is implemented as a bidirectional stream of digital waveform samples containing the transmitted and received signals, where the signals to be transmitted are distributed to all of the aperture blocks 103 for the appropriate magnitude and phase offsets to be applied before being transmitted by each respective aperture 105, and the received signals are aggregated from all of the apertures 105 in the aperture blocks 103 and combined to a single sampled waveform from the terminal as a whole and provided to the modem. Once the satellite link is established, which starts with a receive-only connection being established to locate the target satellite and confirm that the expected signal is received from the satellite before enabling the transmit link, any external data accessories are activated, and the terminal 101 enters 1031 the operation phase 1033. The status of this process and any faults are reported via the status indicators 303.

In the operation phase, step 1033, bidirectional data is transferred, at step 1035, over the satellite links through the combined aperture formed from all of the interconnected apertures 105 in each block 103 of the block assembly. In this phase, both transmitted and received waveforms are continually streamed through the array between the satellite and the modem, subject to any implementation requirements for half-duplex operation. The beam or beams continue to track the satellites, step 1037, and report feedback to the users, step 1039, via the physical user interface 303 or via a data link 461, 451, 421 to an end user device. Tracking data and command and control signals from the primary block 103*m* continue to be transferred between the blocks to update beam pointing directions, power levels, calibration settings, and other operational information of use to the individual blocks within the terminal 101. This process continues while the terminal 101 remains in operation. Terminal status is reported via the status indicators 303 as well as over the data links to the end user device. The terminal will continually monitor the received signal from the satellite to use for tracking purposes. If the received signal is lost, then the transmit beam must be immediately disabled until the received signal can be reacquired, as is standard in SATCOM terminal operation.

Shutdown of the terminal is triggered 1041 either by the user issuing a command through a data link, pressing the power button 301 on the interface of any one of the connected aperture blocks 103, or breaking any one of the connections between blocks by starting to disassemble the terminal 101. The primary block 103*m* then instantly disables 1045 the transmit function of all of the blocks 103, and then powers down the entire system. The user then disassembles and stores 1047 the aperture blocks 103 for transport. As necessary to re-start communications 1011, the process repeats starting with the setup phase 1013.

If new modules 103 are added to a terminal 101. In the operation state 1033, the terminal can either automatically revert back to the setup phase 1013 to reconfigure for the larger size, or wait for the user to request the setup and recalibration process to begin.

This disclosure demonstrates a good configuration for a manpack SATCOM terminal. It is highly modular, with completely interchangeable components. Failure of any one component does not prevent the terminal from operating, instead only a single element is removed. Assembly in the field comprises removing the tiles from a backpack or other carry-case, placing them all facing the sky with a view of the desired satellite in a moderately-level location, and snapping them together. For operation with a LEO constellation, no knowledge of satellite location is needed just a clear view of the sky. Assembly can be accomplished within short minutes. The ports 107 are keyed so that they will only connect if they are supposed to connect, with the apertures facing the same direction (up) and all edges of triangles (for example) aligned with like edges. With integrated batteries, there is no need to find power in order to operate the terminals, and the battery capacity can be scaled up and down to meet application requirements. As environmentally sealed units with integrated, sealed housings that incorporate the RF-transparent radome above the aperture, they are well-suited for operation in dirty environments. The ports themselves are large enough to be easily cleaned or washed of gross debris, and the system is not sensitive to grit, dust, and dirt on the surfaces.

Assembling more aperture blocks 103 together increases the aperture area; the triangular preferred shape 103*x* creates an irregular, non-periodic tiling that is preferred from the perspective of the aperture. This terminal 101 is suitable for both large and small throughput applications—more blocks 103 are used to generate more throughput, since both more RF power as well as aperture area and gain are available for both transmit and receive modes.

Electrical steering of the beams is necessary to allow for both high antenna gain as well as no moving parts. Without electrical steering, the aperture would need to be physically oriented towards the satellite either by the user or by actuators, which is undesirable and removes the key benefits of this terminal. The beam direction is determined by the orchestration controller 339, with the specific settings for the aperture 105 determined by the beam controller processor 327. Each beam is electronically scanned in the way that is appropriate for the type of antenna aperture 105 that is used to implement the antenna. For example, a phased array of patch antennas would have a phase and magnitude setting on each patch antenna that would be configured by the beam controller 327 to produce a beam in the desired direction, subject to calibration coefficients for the specific aperture block.

When an array 101 is assembled of multiple aperture blocks 103, the alignment features built into the interconnection ports 107 will ensure that blocks are connected in acceptable fashions. However, the achievable mechanical tolerances on assembly may not allow for sufficiently repeatable and exact alignment (relative position and orientation) of neighboring aperture blocks 103 that the aperture array could reliably form beams without self-calibration.

Calibration of the array before operation would be intended to correct for relative position and orientation offsets between the aperture blocks 103 forming the array 101, as well as phase differences and mismatches in the interconnections 107 themselves. This process must be automatic in order for this system to operate, since the array is intended to be assembled and disassembled in the field without external equipment.

One solution is to have each of the aperture blocks independently lock onto a strong signal, and measure the differences in the received signals from each block as a way to compute the phase corrections for each block to accurately form beams. This can be done by transmitting test signals from one or more blocks, or by listening to a known satellite signal.

Figure 11:
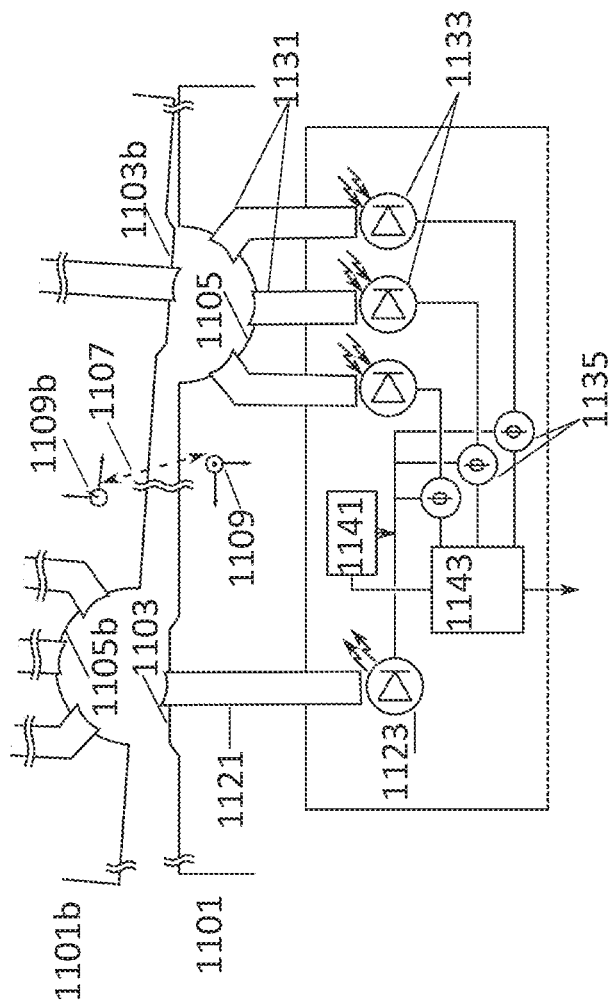
FIG. 11 shows a measurement system for measuring the relative position and alignment between two aperture blocks for on-the-fly calibration purposes.

This method may be improved if the relative positions and orientations of the aperture blocks can be estimated to a high degree of accuracy prior to evaluating the signals in the RF domain. FIG. 11 illustrates a measurement method for characterizing jointly the relative position and orientation offset between two aperture blocks 103. A sensor 1101 can be integrated into an interconnection port 107, and can interface in operation with a second identical sensor 1101*b*. The sensor 1101 includes a single optical or light transmitter 1123 that is coupled through the housing by a light guide 1121 to a transmit port 1103. The light transmitter 1123 can be an infrared, UV, or visible light LED or laser diode.

The sensor includes a corresponding receive port 1105 with three light receivers 1133 and corresponding light guides 1131. The receivers 1133 can be photodiodes or phototransistors. The receive port can have a generally recessed hemispherical shape, with the three light guides spaced in an equidistant pattern across the surface.

The light transmitter is driven by a signal generator 1141 that would create a high-frequency signal, where the desired position measurement precision would be no more than 1 degree of phase at the nominal frequency. For example, to measure distances on the order of 0.1 mm, a signal with maximum frequency content 1 GHz might be selected, since the 30 cm wavelength at 1 GHz yields a light propagation distance of less than 0.1 mm for 1 deg of phase shift. Multiple sinusoidal tones or other signals might be overlayed to allow for more precision on the absolute distance measurements allowed by the sensor 1101.

The Light sensors generate signals corresponding to the light generated by the opposite sensor 1101b. The three received signals are compared to the output of the signal generator and relative time delays/phase shifts measured by comparators 1135, which can be implemented by phase-locked-loops or similar circuits. The measured time offsets and/or phase shifts would then be read by a processor 1143 to compare the relative time delays between the three signals, and therefor the three distances between the transmitter 1103b and the receivers 1131. The processor 1143 also adjusts the signal generator 1141 to match the received signal and convert the two different systems into a single loop. If multiple tones are created by the generators 1141, then filters or frequency diplexers may be used to separate the different tones and compare phases separately in separate comparators 1135, or unified comparators could operate on the aggregate signals.

As this process continues in both associated sensors 1101, 1101b, both sensors generate measurements of the phase offset and therefore relative distances between the transmitters 1103, 1103b and the receivers 1105, 1105b. The arrangement and spacing of the transmitters and receivers 1103, 1105 on one sensor 1101 are known, and are then used to compute with the path length differences/measured relative distances the relative position 1107 and orientations 1109, 1109b of the two aperture blocks. This method uses processing techniques similar to those used for interferometers, and relies on the base time delays in the light guides and processing chain being known to allow their influence to be removed from the position calculations. This position and relative orientation can then be used by the orchestration processors 339 of the blocks 103 to calibrate the arrays and support the beamforming control calculations to set phase weights for each individual aperture 105.

It is noted that the figures show the ports 107 on all sides of each block. However, the ports 107 can be provided on fewer than all sides of each block. In addition, though one example of the port 107 is shown, any suitable port can be utilized and the blocks can electronically and/or mechanically couple together in any suitable manner.

It is noted that the drawings may illustrate, and the description and claims may use geometric or relational terms, such as side, edge, top, bottom, planar, coplanar, parallel, perpendicular, rectangular, square, triangular, circular, polygon, pentagon, equilateral triangle, irregular polygon, etc. These terms are not intended to limit the disclosure and, in general, are used for convenience to facilitate the description based on the examples shown in the figures. In addition, the geometric or relational terms may not be exact. For instance, walls may not be exactly perpendicular or parallel to one another because of, for example, roughness of surfaces, tolerances allowed in manufacturing, etc., but may still be considered to be perpendicular or parallel.

Numerous applications of the disclosure will readily occur to those skilled in the art. Therefore, it is not desired to limit the disclosure to the specific examples disclosed or the exact construction and operation shown and described. Rather, all suitable modifications and equivalents may be resorted to, falling within the scope of the disclosure.

The invention claimed is:

1. A satellite communications terminal, comprising:
a plurality of aperture blocks, individual aperture blocks of the plurality of aperture blocks are removably connected to one or more of the plurality of aperture blocks to form a block assembly with a combined antenna;
one or more interconnection ports within the individual aperture blocks to connect the individual aperture blocks; and
a controller within the individual aperture blocks which measures, using the interconnection ports, one or more characteristics between a selected individual aperture block and each of the plurality of aperture blocks connected to the selected individual aperture block in order to calibrate the combined antenna.

2. The terminal of claim 1, wherein the combined antenna of the block assembly has a combined aperture formed by antenna apertures of the individual aperture blocks.

3. The terminal of claim 1, wherein an antenna aperture of each of the individual aperture blocks is obtained using a lens with a flat surface.

4. The terminal of claim 1, wherein one of the plurality of aperture blocks is selected as a primary block that controls calibration.

5. The terminal of claim 1, wherein the block assembly is configured to act as an integrated terminal, with modem and antenna control unit processing capability, and position and orientation sensors provided by the plurality of aperture blocks or with modem, battery, antenna control unit, and position and orientation sensors provided by an external block.

6. The terminal of claim 1, wherein the controller is a reconfigurable processing device or Field-Programmable Gate Array (FPGA) in each of the plurality of aperture blocks.

7. The terminal of claim 1, further comprising an inductive power coupling providing wireless power transfer between the plurality of aperture blocks.

8. The terminal of claim 1, wherein the interconnection ports have one or more electrical contacts for power transfer, and further comprising a removable cover to protect the one or more electrical contacts.

9. The terminal of claim 1, wherein the interconnection ports use short-range high-frequency wireless communications for data transfer.

10. The terminal of claim 1, wherein the interconnection ports use optical data couplers for data transfer.

11. The terminal of claim 1, further comprising one or more external data transfer and power accessories connected to one or more of the interconnection ports for one or more of the plurality of aperture blocks.

12. The terminal of claim 1, wherein the antenna aperture is a digital phased array, an analog phased array, a lens antenna array, or a liquid crystal-based antenna.

13. The terminal of claim 1, wherein the block assembly self-calibrates to correct phase settings of each of the individual aperture blocks.

14. The terminal of claim 1, wherein relative distance and orientation of the plurality of aperture blocks are determined for calibration by measuring optical path length differences by phase comparisons for high-frequency optically modulated signals from a transmitter contained within one of the individual aperture blocks and a receiver contained within at least three other of the individual aperture blocks.

15. The terminal of claim 1, wherein the terminal is configured to act as a Very Small Aperture Terminal (VSAT) satellite communications terminal.

16. The terminal of claim 1, wherein the terminal operates in commercial and military Ka-band satcom frequencies, in Ku-band satcom frequencies, in X-band satcom frequencies, or across multiple bands.

17. A dynamically configured satellite communication terminal, the terminal comprising:
 a primary modular block, wherein in the primary modular block has a primary antenna aperture; and
 a plurality of modular blocks, wherein the plurality of modular blocks have a corresponding plurality of antenna apertures, the primary modular block and the plurality of modular blocks are interconnected individual blocks of the terminal, an antenna aperture of the terminal is a combination of the primary antenna aperture and the plurality of antenna apertures, and the individual blocks perform communication to determine a number of the individual blocks of the terminal and a geometry and orientation of the individual blocks of the dynamically configured satellite communication terminal.

18. The satellite communication terminal according to claim 17, wherein the antenna aperture of each of the individual blocks is obtained using a lens with a flat surface.

19. The satellite communication terminal according to claim 17, wherein each of the individual blocks includes one or more interconnection ports, each of the individual blocks is connected at a respective interconnection port to one of one or more other individual blocks, and each of the individual blocks performs the communication, via the respective interconnection port, with the one or more other individual blocks.

20. The satellite communication terminal according to claim 19, wherein, for each of the individual blocks, an interconnection at the respective interconnection port to the one of the one or more other individual blocks constrains the one of the one or more other individual blocks to be coplanar with the individual block.

21. The satellite communication terminal according to claim 19, wherein each of the individual blocks performs the communication using electronic components that perform short-range wireless communication, using optical devices, or using electrical contacts.

22. The satellite communication terminal according to claim 17, wherein the primary modular block is selected automatically from among the individual blocks based on a metric determined via the communication.

23. The satellite communication terminal according to claim 22, wherein each of the individual blocks is assigned an address in accordance with a relative position to the individual block that is selected as the primary modular block.

24. The satellite communication terminal according to claim 22, wherein the metric is proximity to a modem of the satellite communication terminal, battery charge level, or relative position among the individual blocks.

25. The satellite communication terminal according to claim 17, wherein the primary modular block directs a self-calibration of the individual blocks to correct for time-dependent changes to thermal or frequency response.

26. The satellite communication terminal according to claim 17, wherein the communication is of digitized waveforms.

27. A method of assembling a modular block for inclusion in a dynamically configured satellite communication terminal, the method comprising:
 arranging two or more interconnection ports to be symmetric across a geometric center of the modular block, wherein each of the two or more interconnection ports facilitates interconnection with another modular block of the satellite communication terminal;
 configuring each of the two or more interconnection ports for communication, wherein the communication among a plurality of the modular blocks of the satellite communication terminal is used to determine a number of the plurality of the modular blocks and a position and orientation of the modular block among the plurality of the modular blocks.

28. The method according to claim 27, further comprising arranging a lens with a flat surface to implement an antenna aperture of the modular block.

29. The method according to claim 27, wherein the configuring each of the two or more interconnection ports for communication includes configuring each of the two or more interconnection ports for communication of digitized waveforms.

30. The method according to claim 27, wherein the configuring each of the two or more interconnection ports for communication includes arranging electronic components that perform short-range wireless communication, optical devices, or electrical contacts.

* * * * *